US 8,595,685 B2

(12) United States Patent
Sharma et al.

(10) Patent No.: US 8,595,685 B2
(45) Date of Patent: Nov. 26, 2013

(54) METHOD AND SYSTEM FOR SOFTWARE DEVELOPER GUIDANCE BASED ON ANALYZING PROJECT EVENTS

(75) Inventors: Vibhu Saujanya Sharma, Aligarh (IN);
Vikrant Shyamkant Kaulgud, Pune (IN)

(73) Assignee: Accenture Global Services Limited, Dublin (IE)

( * ) Notice: Subject to any disclaimer, the term of this patent is extended or adjusted under 35 U.S.C. 154(b) by 771 days.

(21) Appl. No.: 12/783,582

(22) Filed: May 20, 2010

(65) Prior Publication Data
US 2011/0252394 A1 Oct. 13, 2011

(30) Foreign Application Priority Data
Apr. 7, 2010 (IN) .............................. 966/CHE/2010

(51) Int. Cl.
*G06F 9/44* (2006.01)
(52) U.S. Cl.
USPC ............................................ 717/101; 706/52
(58) Field of Classification Search
None
See application file for complete search history.

(56) References Cited

U.S. PATENT DOCUMENTS

| 8,250,532 | B2* | 8/2012 | Guyette ........................ 717/120 |
| 2005/0165709 | A1* | 7/2005 | Bromberg et al. .............. 706/52 |
| 2010/0083223 | A1* | 4/2010 | Chouinard et al. ........... 717/110 |
| 2011/0225565 | A1* | 9/2011 | van Velzen et al. ........... 717/114 |

* cited by examiner

*Primary Examiner* — Hyun Nam
(74) *Attorney, Agent, or Firm* — Finnegan, Henderson, Farabow, Garrett & Dunner LLP

(57) ABSTRACT

In systems and methods for providing assistance to software developers, a profile of a software developer is accessed. The profile contains a software development history of the software developer. Event data is developed comprising data related to at least one software code event associated with a software development project and with the software developer. Guidance is selected for use by the software developer in resolving a software development problem, based on an analysis of the event data, data related to the software development project, data related to an environment in which the at least one software code event occurred, and the profile. Feedback regarding progress of the software developer in the development project is also developed from the event data and the profile. The guidance and feedback are presented to the software developer via an interactive console unit.

24 Claims, 12 Drawing Sheets

FIG. 4

400 — Developer Static Profile for | Name 410 |

Developer employment status: 430

Contact information: 420

Company: 440

Area(s) of specialization, expertise, skill, or proficiency: 470
- *Primary:* 472
- *Secondary:* 474

Time in service: 450

Availability: 460

FIG. 8a

Guidance Record 800    ID 810

| Type 820 | Methodology 860 |
| Source 830 | |
| Summary 840 | API 870 |
| Links 845 | Time Stamp(s) 880 |
| Environment 850 | Success 890 |

FIG. 8b

| Event Category | Class 822 | Scope 824 | Guidance Precedence/Order 826 | | |
|---|---|---|---|---|---|
| | | | Primary 827a | Secondary 827b | Tertiary 827c |
| Local 816a | Compile Issues | Public API problem | Online knowledge bases (www) | Org level knowledge base (Kx) | Collaboration with a team member (Collab) |
| | | Private API problem | Internal Project Artifacts (IntProj) | Collab | |
| | Code Quality Issues | Public standard | www | Kx | Collab |
| | | Project standard | IntProj | Collab | Kx |
| | Test Related | Project specific | IntProj | Collab | |
| Global (Central) 816b | Code Quality Issues | Public std. | www | Kx | Collab |
| | | Project std. | IntProj | Collab | Kx |
| | Test Related | Project specific | IntProj | Collab | |
| | Integration Failure | | Collab | IntProj | Kx |

815

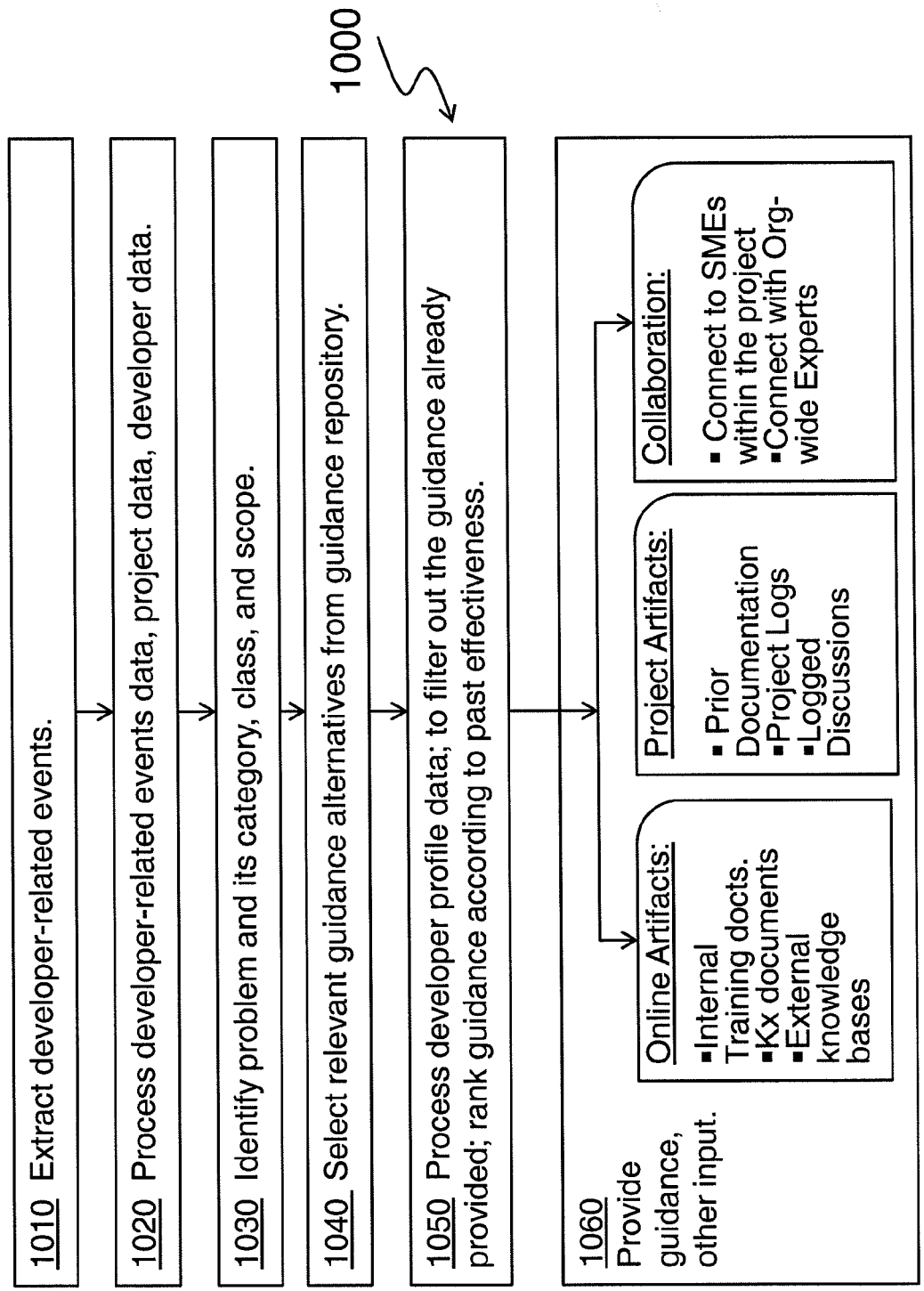

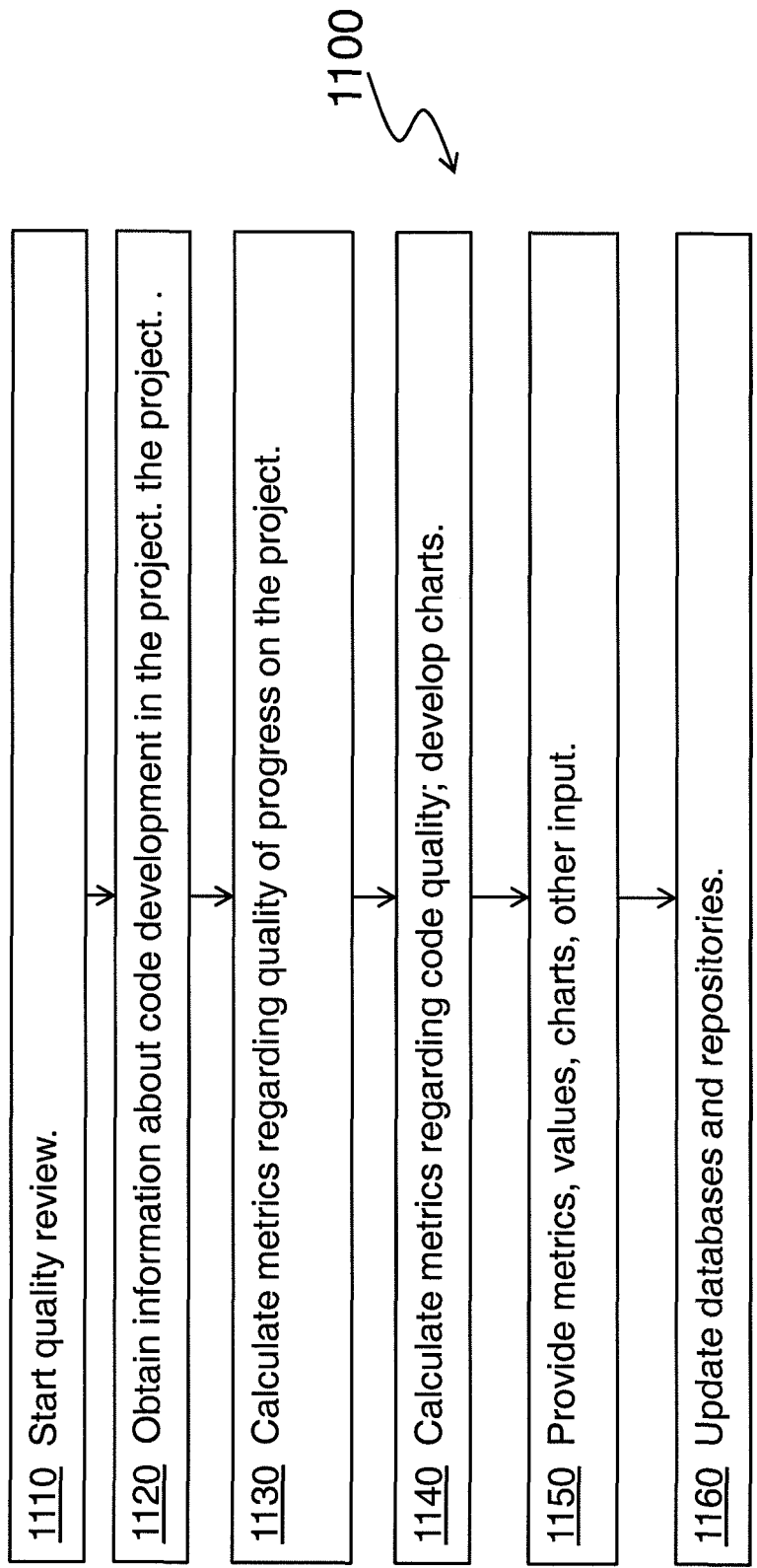

METHOD AND SYSTEM FOR SOFTWARE DEVELOPER GUIDANCE BASED ON ANALYZING PROJECT EVENTS

RELATED APPLICATIONS

This application claims priority to Indian Patent Application 966/CHE/2010, entitled "METHOD AND SYSTEM FOR SOFTWARE DEVELOPER GUIDANCE BASED ON ANALYZING PROJECT EVENTS," and filed Apr. 7, 2010.

FIELD

The present disclosure relates to the field of software development.

BACKGROUND

As known in the art, software code comprises instructions that may be used to control or instruct the operation of one or more processing devices, such as microprocessors, microcontrollers, co-processors, etc. It is not uncommon for software development projects to require the services of numerous software code developers and their supervisors for periods of time stretching over many months or even years. A software development project involves several types of tasks, such as coding, writing tests for the code, performing the tests, analyzing the results, and debugging.

Software developers often face problems in performing the tasks assigned to them in a software project. While the problem remains unresolved, the developers' projects may be stalled. A developer may not have the information necessary to solve the problem. If the information is available, the developer may not know how to apply the information to solve the problem. In addition, frequently, problems may recur. In many cases, developers themselves may not be able to detect a trend of problems they are repeatedly encountering. Even if they do detect a trend, they typically have little clue how to alleviate the same.

Problems that software developers face have often arisen before in other software development projects under similar circumstances or in similar environments. A typical software development project emits out many events related to the activities performed by developers. Analyses of those events or even just information about those events could be useful to a developer to suggest the needed guidance to mitigate problematic situations. When a problem arises, it would be helpful to a developer to obtain information about the problem as it has previously arisen, such as the frequency with which it has arisen, the environment in which it developed, other problems or events with which it has been associated, and successful and unsuccessful approaches that others may have used in attempts to resolve the problem.

However, project tools today have a very limited ability to aid and assist a software developer when he/she gets stuck or encounters problems repeatedly, unless the developer explicitly asks for assistance. Further, conventional software development systems typically do not provide developers with assistance in detecting trends in problems.

Not only does software development generate a considerable amount of project data pertaining to events and the operation of multiple servers, repositories, and workstations, it generates considerable data pertaining to the behavior and productivity of individual software developers and development teams. Typically, much of the generated data remains unused. Analysis of the data could provide a valuable in-process feedback on the progress of a developer or a development team with the project.

It would be helpful to software development to leverage project data along with profiles of individual developers or development teams to assist developers and development teams in obtaining guidance and in-process feedback.

SUMMARY

Systems and methods for providing software developer guidance based on analyzing project events are herein described. In one embodiment, providing assistance to software developers comprises accessing a profile of a software developer and developing event data with an events extractor. The profile comprises information about a software development history of the software developer, and the event data relates to at least one software code event associated with the software developer. Guidance is selected, with an events and environmental data processor, for use by the software developer in resolving a software development problem. The guidance is selected based on an analysis of the event data, data related to the software development project, data related to an environment in which the at least one software code event occurred, and the profile of the software developer. The guidance is presented to the software developer with a display device comprising an interactive console unit.

In one embodiment, the profile includes information about previous software development experience by the software developer. In another embodiment, the profile includes information about previous software coding problems faced by the software developer. In another embodiment, the previous software coding problems comprise recurring software development problems faced by the software developer. In another embodiment, the previous software coding problems comprise software development problems having a high likelihood of having been resolved. In one embodiment, the profile includes information about previous system failures associated with the software developer.

In one embodiment, the guidance is selected based on heuristic rules. In another embodiment, an extent of difficulty of the software development problem is identified and is used with the other data to select the guidance. The guidance that has already been provided to the software developer may also be filtered out in guidance selection. In another embodiment, the guidance alternatives are ordered according to past effectiveness in resolving one or more software development problems.

In one embodiment, the guidance comprises a suggestion to refer to documentation related to a second software development project and identification of the documentation related to the second software development project. The guidance may also comprise a suggestion to refer to documentation related to the software development project and an identification of the documentation related to a second software development project. The guidance may also comprise a suggestion to collaborate with another person or entity and identification of the other person or entity.

In one embodiment, the guidance may be developed in response to an automated identification of a need for the guidance. In one embodiment, the need for the guidance is identified based on trends in software development problems faced by the software developer.

In one embodiment, feedback may be developed relating to progress of the software developer in the development project. The feedback may be developed from the event data and the profile and presented to the software developer via a display device comprising an interactive console unit. Further embodiments comprise developing a value for at least one metric related to an extent of the developer progress in the development project, and developing a value for at least one metric related to a quality of the software developer progress in the development project. Developing the feedback may further comprise identifying a trend in the software developer progress and presenting data corresponding to the trend, and/or developing a value related to the software developer progress relative to progress by other software developers.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 4 is a block diagram of an exemplary developer static profile record 400 stored in developer profile 140 shown in FIG. 1;

FIG. 8a is a block diagram of an exemplary Guidance record 800 stored in the guidance repository 150 shown in FIG. 1;

FIG. 8b is a table showing an example set of heuristic rules stored in the guidance repository 150 shown in FIG. 1;

FIG. 10 is a flowchart depicting an exemplary process for providing software developer guidance; and FIG. 11 is a flowchart depicting an exemplary process for providing feedback to a software developer.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts.

Figure 1:
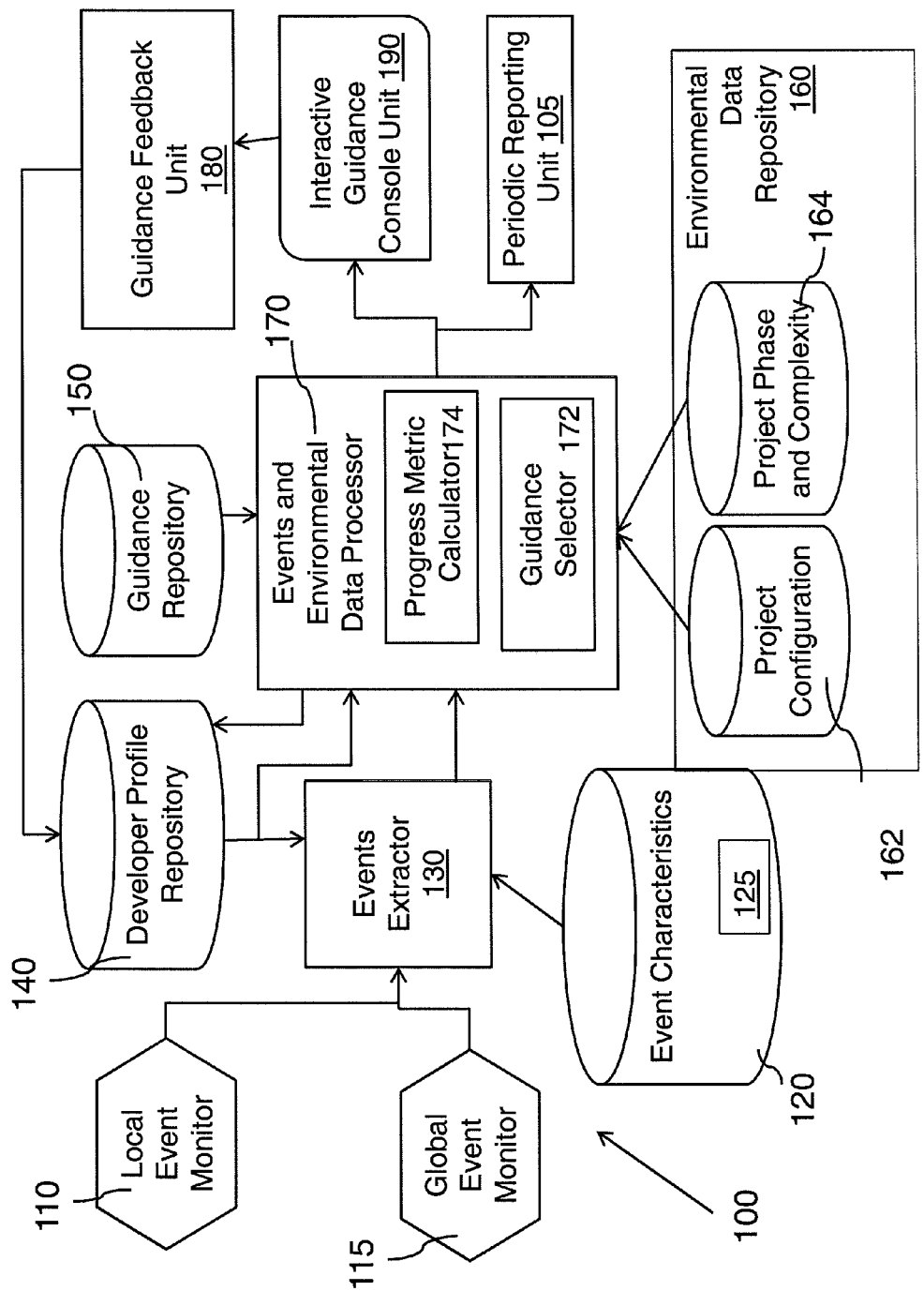
FIG. 1 is a block diagram of an exemplary software developer guidance system.

FIG. 1 shows an exemplary embodiment of a software developer guidance system 100 for providing software developer guidance consistent with the disclosure herein. The system 100 provides in-process guidance and feedback to software developers using project event and environmental data, at least one developer profile, and the available sources of guidance. System 100 is configured to instrument the project environment to collect rich event data and to leverage various project and developer-related repositories and heuristic rules in order to select guidance and feedback for the software developer.

Figure 2:
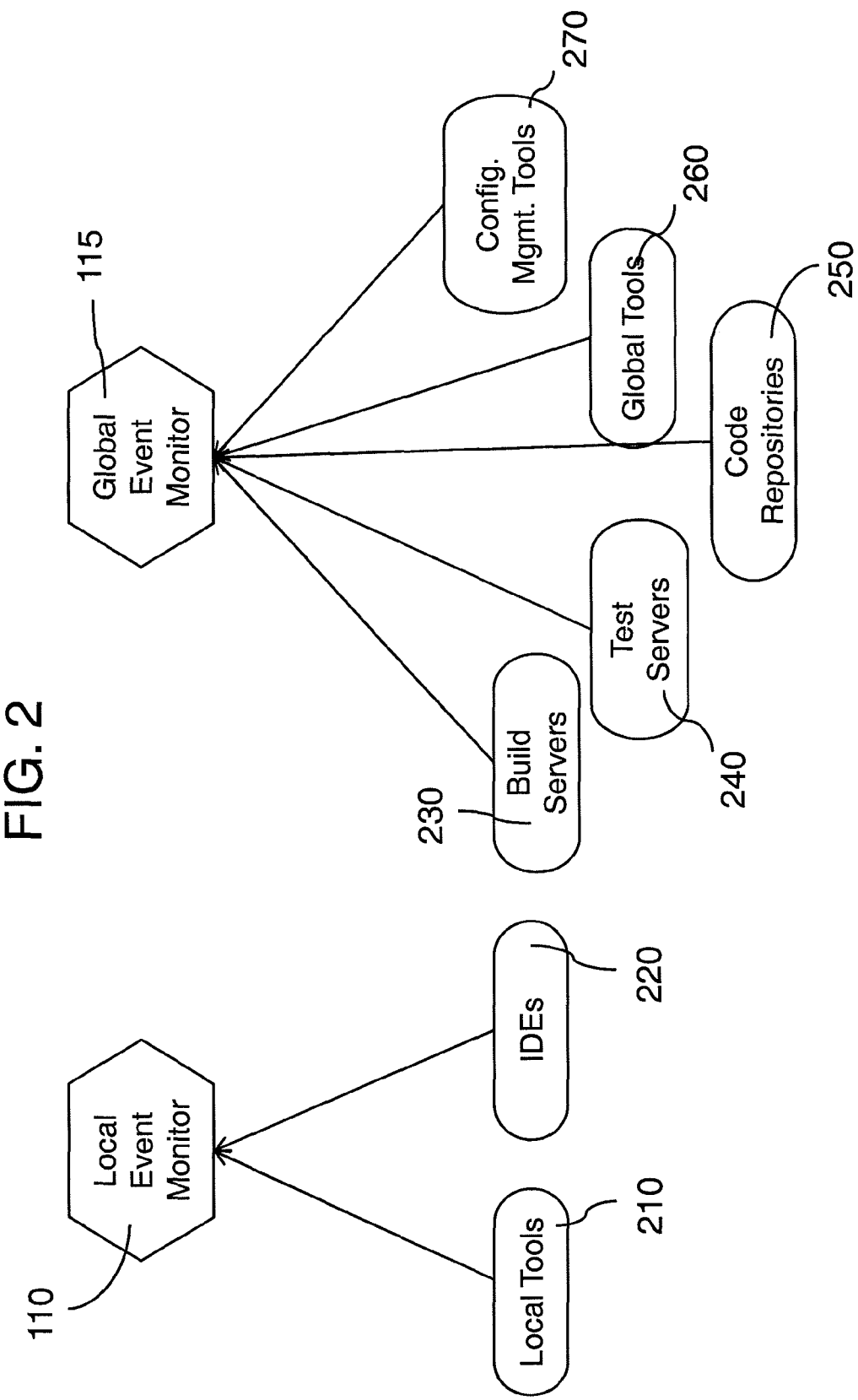
FIG. 2 is a block diagram showing associations with an exemplary local event monitor 110 and global event monitor 115 shown in FIG. 1.

As shown in FIG. 1, system 100 may comprise a local event monitor 110, a global event monitor 115, an events characteristics database 120, an event extractor 130, a developer profile repository 140, a guidance repository 150, an environmental data repository 160, an events and environmental data processor 170, a guidance feedback unit 180, an interactive guidance console unit 190, and a periodic reporting unit 105. One of skill in the art will appreciate that although only one of each of the components identified above are depicted in FIG. 1, any number of these components may be provided. Furthermore, one of ordinary skill in the art will recognize that functions provided by one or more components of system 100 may be combined or incorporated into another component shown in FIG. 1. For example, local event monitor 110 and global event monitor 115 may be combined into a unitary event monitor, or they may be eliminated completely, with the inputs of event monitors 110, 115 as shown in FIG. 2 and described below input directly into event extractor 130.

One or more of the components depicted in FIG. 1 may be implemented in software on one or more computing systems. For example, they may comprise one or more applications, which may comprise one or more computer units of computer-readable instructions which, when executed by a processor, cause a computer to perform steps of a method. Computer-readable instructions may be stored on a computer-readable medium, such as a memory or disk. Such media typically provide non-transitory storage. Alternatively, one or more of the components depicted in FIG. 1 may be hardware components or combinations of hardware and software such as, for example, special purpose computers or general purpose computers. A computer or computer system may also comprise an internal or external database. The components of a computer or computer system may connect through a local bus interface.

In certain embodiments, one or more of the components shown in FIG. 1 may be a computer server with web services enabled. For example, the events and environmental data processor 170 could contain a processor web service for processing events and environmental data. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections.

Database 120 and repositories 140, 150, and 160 may be implemented as separate databases and repositories as shown in FIG. 1 or as one or more internal databases stored, for example, on event extractor 130 or on events and environmental data processor 170. Database 120 and repositories 140, 150, and 160 may be accessed by other components in system 100 directly via an external connection or via a network (not shown).

The local event monitor 110, which in one embodiment may reside on a developer's workstation (not shown), is configured to monitor events related to the developer's activities at a workstation in creating code. Such activities may include but are not limited to writing, debugging, editing, and saving code. As shown in FIG. 2, monitor 110 may monitor local tool events and Integrated Development Environment (IDE) events. Local tool events include events arising from the operation of development tools 210 such as code quality or other evaluative testing tools used locally at the developer workstation. Examples of code quality tools include but are not limited to PMD, Checkstyle, Findbugs, and Jdepend, JavaNCSS, and examples of testing tools include but are not limited to Junit harnesses, Ncover, Emma, and Cobertura, IDE events relate to the operation of IDEs 220 such as the EMC™ IDE, the Microsoft™ .NET framework, the Microsoft™ Visual Studios IDE for writing and debugging code, and the Eclipse™ IDE for incorporation of open source code.

The global event monitor 115, which in one embodiment may comprise adaptors residing on the individual servers and repositories and a centralized monitor residing on a server on the network, is configured to monitor events that are remote from the developer workstation. As shown in FIG. 2, monitor 115 may monitor build server events, test server events, code repository events, global tool events, and configuration management tool events.

Build server events include events arising from or at the build servers 230 upon which the code is aggregated and compiled. Test server events include events arising from or at the test servers 240 due to the operation of test suites. Examples of build server event data include but are not limited to identification of the test suite, the run results of the test suite, data about a failing of a test, and data from a module that failed. Code repository events include events arising from or at the repositories 250 due to checking code out of and in to repositories 250. The code repository events may include, for example, attributes such as time stamps for the beginning and end of the transaction, the sections of the code that were affected, and the identity of the person who checked out or checked in the code. Global tool events include events arising from the operation of development tools 260 by other developers or other development teams. Configuration management tool events include events arising from the use of configuration tools 270 such as, for example, particulars as to what was checked in or out, who checked them in or out, and when they were checked in or out.

Figure 3:
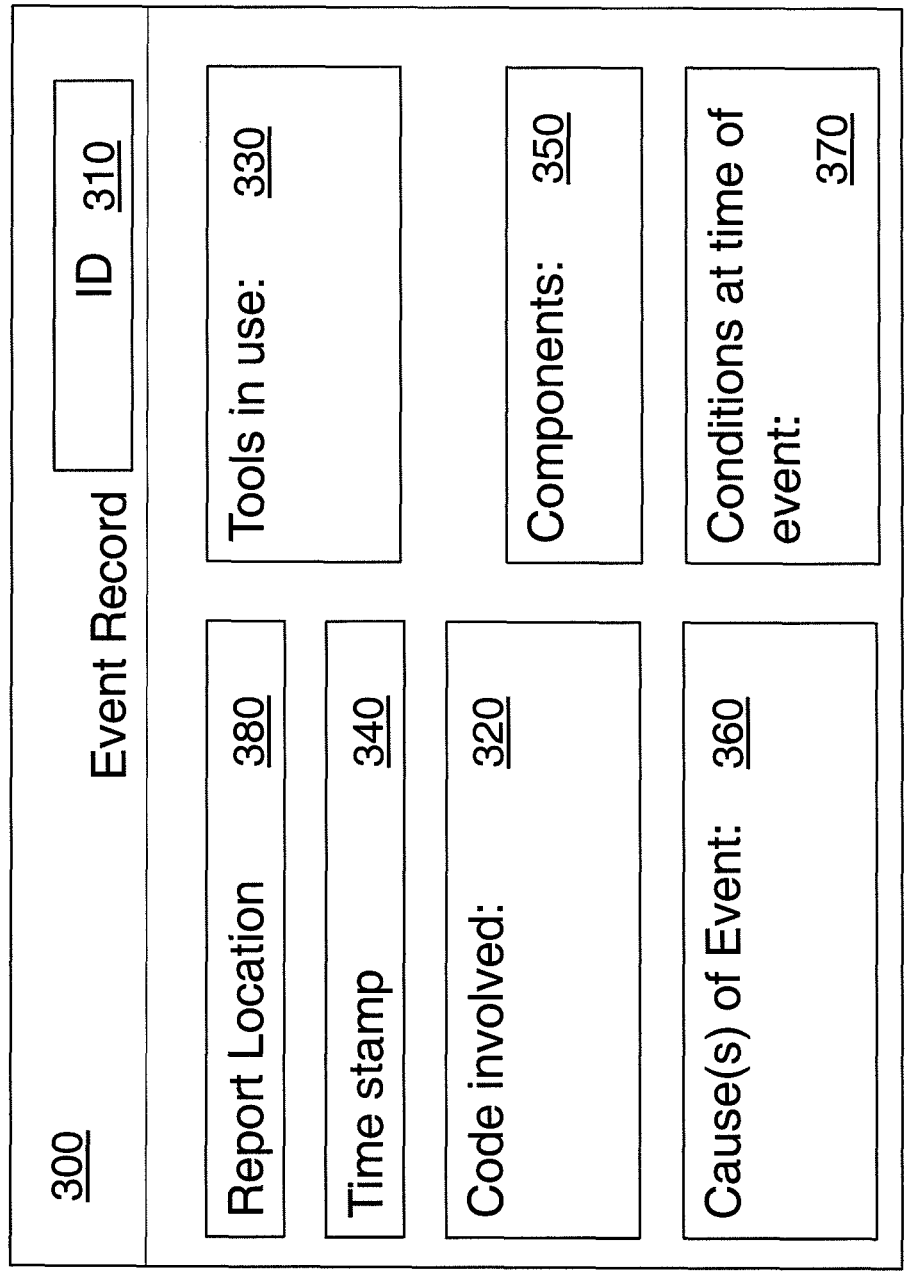
FIG. 3 is a block diagram of an exemplary event 300 stored in the event characteristics database 120 shown in FIG. 1.

The events extractor 130 may be configured to extract events from the event characteristics database 120, which may stores records identifying the attributes of previous events. As shown in FIG. 3, one embodiment of a record 300 of an event in the event characteristics database 120 has an ID field 310 for a unique identifier of the event. Record 300 may also have a Code Involved field 320 for storing an identifier of the code involved in the event, a Tools In Use field 330 for storing identifiers of the tools in use at the time of the event, a Time Stamp field 340 for storing time stamps for the event, a Components field 350 for storing identifiers of the components involved in the event, a Cause(s) of the Event field 360 for storing information as to who or what caused the event, a Conditions field 370 for storing information about the condition of the components and code at the time of the event, and a Report Location field 380 for storing the location of reports of the event or, in one embodiment, hyperlinks to the reports. The event characteristics database 120 may also have an Event Log record 125 storing the log itself of the events that have been reported.

The events extractor 130 is configured to extract data from the developer profile repository 140, which may store developer profiles. Developer profiles, which contain a software development history of a software developer, may be of any suitable kind. In one embodiment, records for at least two types of developer profiles are stored in the repository 140, for example, static profiles and dynamic profiles.

Static profiles may contain relatively unchanging developer information. In one embodiment, as shown in FIG. 4, a record 400 for the static profile may contain an ID field 410 to contain an identifier of the developer (such as a name or ID number) and a Contact Information field 420 for storing the contact information for the developer. The record 400 may also have a Developer Employment Status field 430 for storing data about the status of the developer (e.g., consultant, contractor, employee); a Company field 440 for storing data identifying the name of the company, division, or unit employing the developer; a Time in Service field 450 for storing data identifying how long the developer has been a code developer at the company identified in field 440.

The record 400 may also contain an Availability field 460 for identifying information regarding the developer's availability. For example, the field 460 may contain data relating to the length of time that a developer is committed to working on a selected project, future projects to which the developer is committed, and any constraints as to availability such as upcoming vacations, sabbaticals, or agreements restricting the developer from working with selected groups or technologies or requiring the worker to work in a particular area. Record 400 may also have an Area(s) of Specialization field 470 for storing information related to a developer's areas of specialization, expertise, skills, or proficiency. The field 470 may have a primary sub-field 472 and secondary sub-field 474 to prioritize the areas of specialization.

Figure 5:
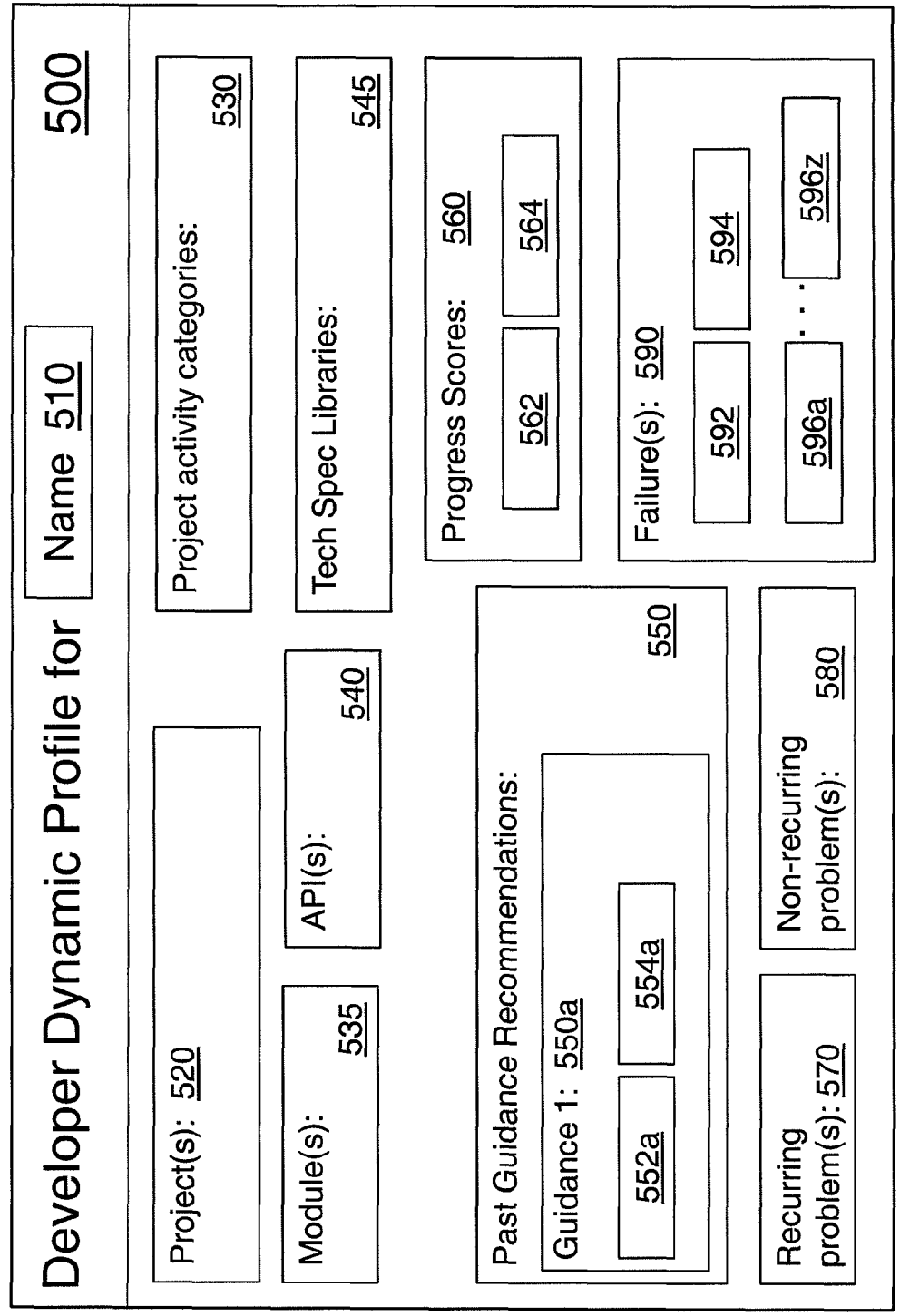
FIG. 5 is a block diagram of an exemplary dynamic profile record 500 stored in developer profile 140 shown in FIG. 1.

Dynamic profiles may contain more current and more frequently changing information about the developer. In one embodiment, as shown in FIG. 5, a record 500 for a dynamic profile may contain a Name field 510 for identifying the subject developer. The record 500 may be configured to store project specific information. For example, it may have a Project(s) field 520 to identify the projects on which the developer has worked recently (in the last X years, months, or weeks). The record 500 may have a Project Activity Categories field 530 to store information about the category or categories of project activities to which the developer has been assigned recently. The categories of project activities may include, for example, writing code, testing code, reviewing code, or debugging code.

The record 500 may also have a Modules Field 535 and an API field 540 for identifying, respectively, the modules and the Application Programming Interfaces (APIs) with which or on which the developer has worked recently. The record 500 may also have a Technical Specifications Library field 545 for identifying the technical specification libraries that the developer has accessed recently. As will be described below in greater detail, such project specific information may be useful to determine the pertinence of the developer's input about a problem or the pertinence of the project to a project for which guidance is being solicited.

The record 500 may also have a Past Guidance Recommendations field 550 to store information related to the past guidance recommendations that have been presented to the developer, such as by an guidance feedback unit 180, which is described in more detail below. The field 550 may also have sub-fields such as sub-field 550a to record each instance of guidance supplied to the developer. The sub-field 550a may have additional sub-fields such as sub-fields 552a, 554a to identify the manner in which and the extent to which the developer followed the past guidance recommendations.

The record 500 may also have fields to store metrics values related to the developer's efforts on his or her current projects. For example, the record 500 may have Progress Scores field 560 for storing metrics values that measures the quality of the developer's performance as a code developer. One embodiment of such metrics is the Personal Quality Score (PQS). In one embodiment, an individual PQS is a composite score which is determined at selected intervals, such as on a daily basis, for each developer of a software development team.

While PQS may be determined in any convenient manner, two examples of PQS include a Personal Quality Score 1 (PQS1) and a Personal Quality Score 2 (PQS2).

PQS1 may be a composite score based on the violations reported by code quality tools during an analysis interval, such as a ratio of the weighted sum of the violations categorized into different severity levels (e.g. High, Medium, and Low severity) to the total number of non-commenting source statements in those portions of the software code developed by the developer during the analysis interval. Weights may be assigned to each severity category based on the project manager's perception of the criticality of a category from a project perspective.

PQS2 may be a ratio of the weighted sum of the violations categorized into different severity levels (e.g. High, Medium, and Low severity) to the total number of "modified" non-commenting source statements in those portions of the software code developed by the developer during the analysis interval. While PQS1 may give an indication of the impact on quality of the modified software code, PQS2 may be a more developer-centric and personal metric that indicates the quality of the "last modification episode" of a developer.

Another progress score may be a Failed to Successful Unit Tests (FSUT) ratio. While PQS1 and PQS2 may reflect the adherence of the developer to coding best practices, FSUT may reflect functional quality of the code as determined by unit testing, as known in the art. PQS1, PQS2, and FSUT ratios are normalized to allow appropriate comparison and benchmarking.

The quality metrics described above for an individual developer may be combined to provide a Developer Quality Score (DQS) for the developer. In one embodiment, DQS is calculated by first calculating a weighted average of PQS1 and FSUT. The weights may be predetermined by a project manager to reflect the importance given by the project to adherence to coding standards vis-à-vis functional testing. Based on the weighted average, a lookup table may be used to map the weighted average to the DQS score. Alternatively, DQS may be determined by associating project-specific thresholds on PQS1 and FSUT to determine whether PQS1 and FSUT individually are "good" or violating norms. Based on the individually determined sufficiency of PQS1 and FSUT, a table lookup mapping these two parameters to the DQS may provide a developer-specific DQS. In either case, it may be desirable to make the constituent PQS1 and FSUT data leading to the DQS and, likewise, the constituent violations leading to the PQS1, available for inspection to a user (e.g., the developer in question), thereby allowing the user to understand the rationale behind the DQS. In one embodiment, the constituent violations and constituent PQS1 and FSUT data may be stored in record 500 and presented to the developer on interactive feedback console unit 105.

In a similar vein, aggregated quality metrics corresponding to portions of software attributable to more than a single developer (e.g., from a small team of developers all the way up to the entire project's development team) may be determined. Once again, such aggregated quality metrics may be determined on a daily basis or according to any convenient interval. Generally, this is accomplished by retrieving the quality metrics at the desired level of abstraction and determining scores according to that level of abstraction. Further scores at higher levels of abstraction (e.g. broader abstraction levels) may be determined by combining the initial aggregated scores. In one embodiment, the aggregate scores at various levels of abstraction may be calculated and presented to the developer on interactive feedback console unit 105.

Embodiments of PQS, FSUT, and DQS are described in further detail in co-pending Indian Patent Application 1986-MUMNP-2009, filed Sep. 1, 2009, and entitled "COLLECTION AND PROCESSING OF CODE DEVELOPMENT INFORMATION" (Applicant reference number 02079-PR/IN). PQS, and related values PQS1 and PQS2 described in the above-identified patent application, may be correlated to the quality of the source code produced by the developer. The Progress Scores field 560 may have a PQS1 sub-field 562 and a PQS2 sub-field 564 to store the developer's current values of PQS1 and PQS2.

The dynamic profile may also identify the top recurring problems (RP) that the developer has faced. In one embodiment, each developer's profile only stores her own information only, while the developer profile repository may have profiles for each developer on the development team. For example, in one embodiment, RP(n) could be a set of type "Quality issues" and could constitute the set of problem issues that have been identified across the majority of the past n measurements or observations of problem issues. RP(n) having a large number of elements could indicate that the code under development is of high complexity. Alternatively, or in addition, a large RP(n) could indicate that the code under development has low tool coverage (Tcov). Tcov may be used to identify which statements have been executed and how often. A low Tcov may demonstrate that the code has not been tested enough.

The record 500 may have a Recurring Problem(s) field 570 that stores the set of recurring problems in the developer's current projects. In one embodiment, the set of recurring problems is the set of problems that have occurred in the majority of a series of observations of problems. One of ordinary skill in the art will understand that a problem may be characterized as recurring based on any suitable criteria. For example, a problem may be characterized as recurring if it is observed in more than a quarter of a series of observations. Further, the observations that define a problem as recurring need not be serial. The set of observations upon which a problem's characterization as recurring could be a random sample of observations. Other characterizations of a problem as recurring may be based on whether a problem has been observed a selected number of observations in a series.

Figure 6:
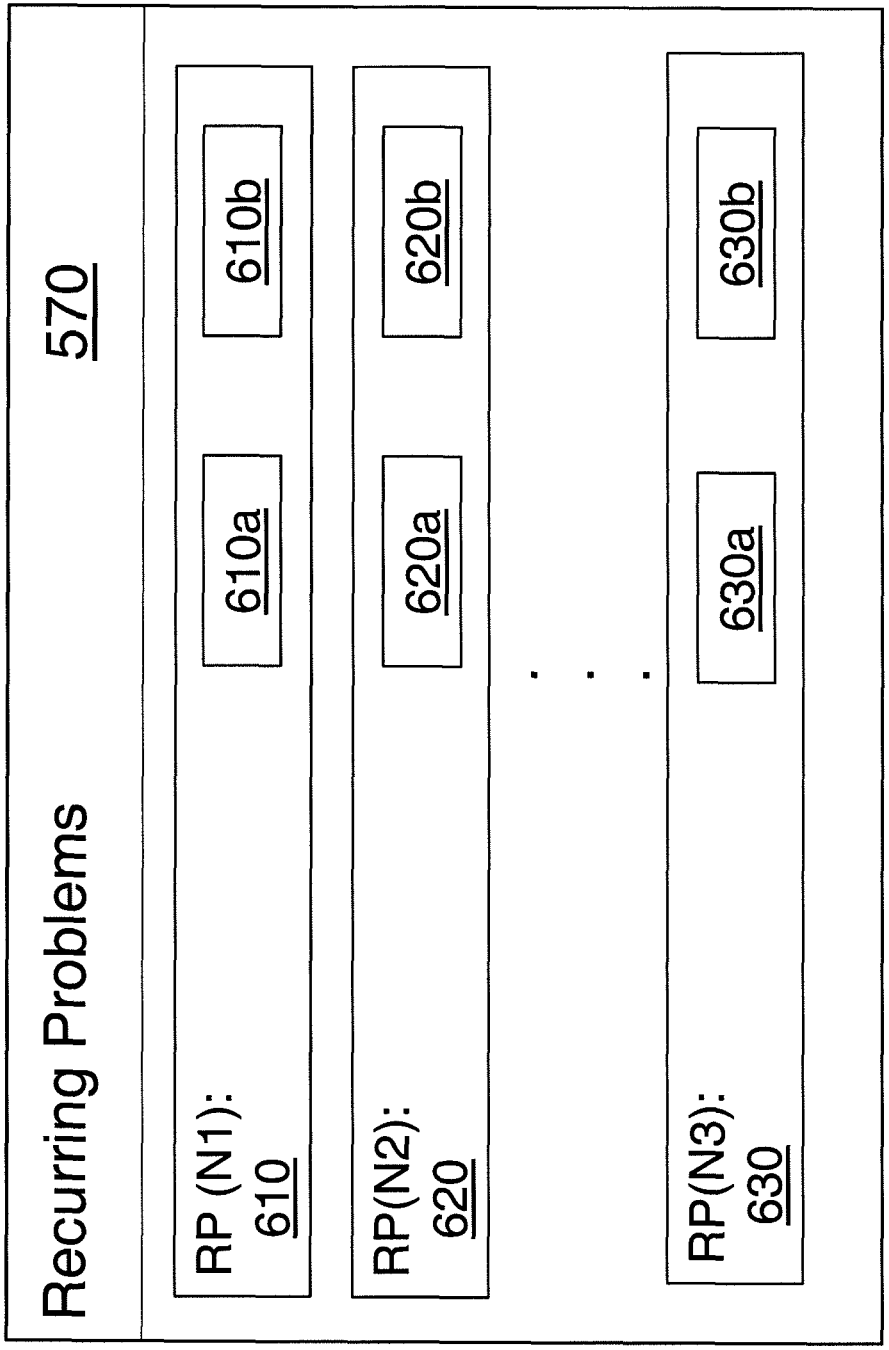
FIG. 6 is a block diagram of an exemplary Recurring Problems field 570 in the exemplary dynamic profile record 500 shown in FIG. 5.

The field 570 may store numerous sets of recurring problems. FIG. 6 shows one embodiment of a field 570 for the embodiment in which a problem is characterized as recurring when it has been observed in a majority of a series of observations of problems. The field 570 may have a plurality of sub-fields for storing the observed sets of recurring problems identified across multiple observations of problems. For example, sub-fields 610, 620, 630 may have sub-fields 610a, 620a, 630a for storing sets RP(n1), RP(n2), RP(n3), which are the sets of problems that are characterized as recurring. In the embodiment in which a problem is characterized as recurring when it has been observed in a majority of a series of observations of problems, RP(n1), RP(n2), and RP(n3) are the sets of problems that are characterized as recurring in the past n1, n2, and n3 observations, respectively. Sub-fields 610, 620, 630 may have sub-fields 610b, 620b, 630b for storing the values n1, n2, n3 respectively. Alternatively, the field 570 may have Problem sub-fields for identifying the problems that the developer has faced, with sub-fields containing identifiers of the observations in which the problem was identified, so that any desired set of recurring problems across a selected number of observations could be determined based on inspection of the Problem sub-fields.

The dynamic profile may also identify the problems that recurred in the past, but that no longer occur. If problems no longer occur, the likelihood increases that they are solved. For example, in one embodiment, a set of problems that are likely to have been solved may be developed. The set may be known as Non-Recurring Past (NRP) issues, and is the set of recurring problems that are likely no longer recurring in the development project. One of ordinary skill in the art will understand that a problem may be characterized as no longer recurring based on any suitable criteria. In one embodiment, a problem may be characterized as not recurring and therefore included in NRP based on not having been observed for a selected amount of time, for a selected number of observations, or in a selected number of observations in a series. Alternatively, it may be characterized as not recurring if it has not been observed in a majority of observations in a set of observations. In one embodiment, NRP may be developed from two sets of recurring problems, for example, from RP(n) and RP(n-x), using the formula NRP(n)={RP(n)}−{RP(n-x)}.

Thus, in the embodiment in which a problem is characterized as recurring when it has been observed in a majority of a series of observations of problems, NRP(n) may be the set of problems that occurred across the majority of the past n observations of problem issues {RP(n)}, excluding the problems that occurred across the majority of the past n-x measurements of problem issues {RP(n-x)}. So, for example, for an embodiment in which 50 observations were made of problems, and a set of problems that recurred across in the last 50 observations and a set of problems that were identified across the last 20 observations, RP(50) is the set of problems with recurrence across the last 50 measurements, and RP(20) is the set of problems with recurrence across the past 20 measurements. NRP(50) is the set of problems that were contained in RP(50) but not in RP(20). Therefore, NRP(50) is the set of problems that had been observed to recur starting 50 observations ago, but that ceased to recur 20 observations ago.

NRP may be defined in any suitable way, depending on the objectives of the developers of system 100. System developers may be more interested, for example, in identifying trends in the number of non-recurring problems than in actually identifying the problems that are no longer recurring. There may be some problems that are recurring across a number of problem observations, but they are not appearing in a significant number such that they are counted as recurring. For example, in the embodiment in which a problem is characterized as recurring when it has been observed in a majority of a series of observations of problems, a problem X needs to recur 26 time in 50 observations to be considered "non-recurring." However, if problem X appears five times in every ten observations during observations 1-40 and six times during observations 41-50, it will be characterized as a recurring problem in the most recent 50 observations (26 recurrences out of 50), but not in the most recent 40 observations (20 recurrences out of 40), the most recent 30 observations (15 recurrences out of 30), the most recent 20 observations (10 recurrences out of 20), and the most recent 10 observations (26 recurrences out of 50). Therefore, problem X would be included in NRP(50–30) because it was considered recurring in RP(50) but not in RP(30). In another example, if problem Y recurred frequently in observations 21-30 but was not observed starting 20 observations ago, and if NRP is developed from the most 50 and 30 observations, Problem Y might not be included in the set NRP. Nonetheless, if the developers of system 100 are more interested in using NRP to analyze the trends in recurring and non-recurring problems than in using NRP to identify the actual problems that are recurring, it may be acceptable for NRP to include in its membership problems that recur at relatively low rates or to exclude certain problems that recurred for a short period of time but stopped recurring.

Therefore, depending on how RP and NRP are calculated, while new issues may have arisen in the past x observations, or old issues start recurring again, membership in NRP(n) may represent a likelihood that a problem has stopped recurring, and trends in RP and NRP may be analyzed to identify an extent of recurring or resolved problems. In other words, depending how RP and NRP are defined, there may be positive correlation between the number of member of the set NRP(n) and the number of software development issues that have been resolved.

Figure 7:
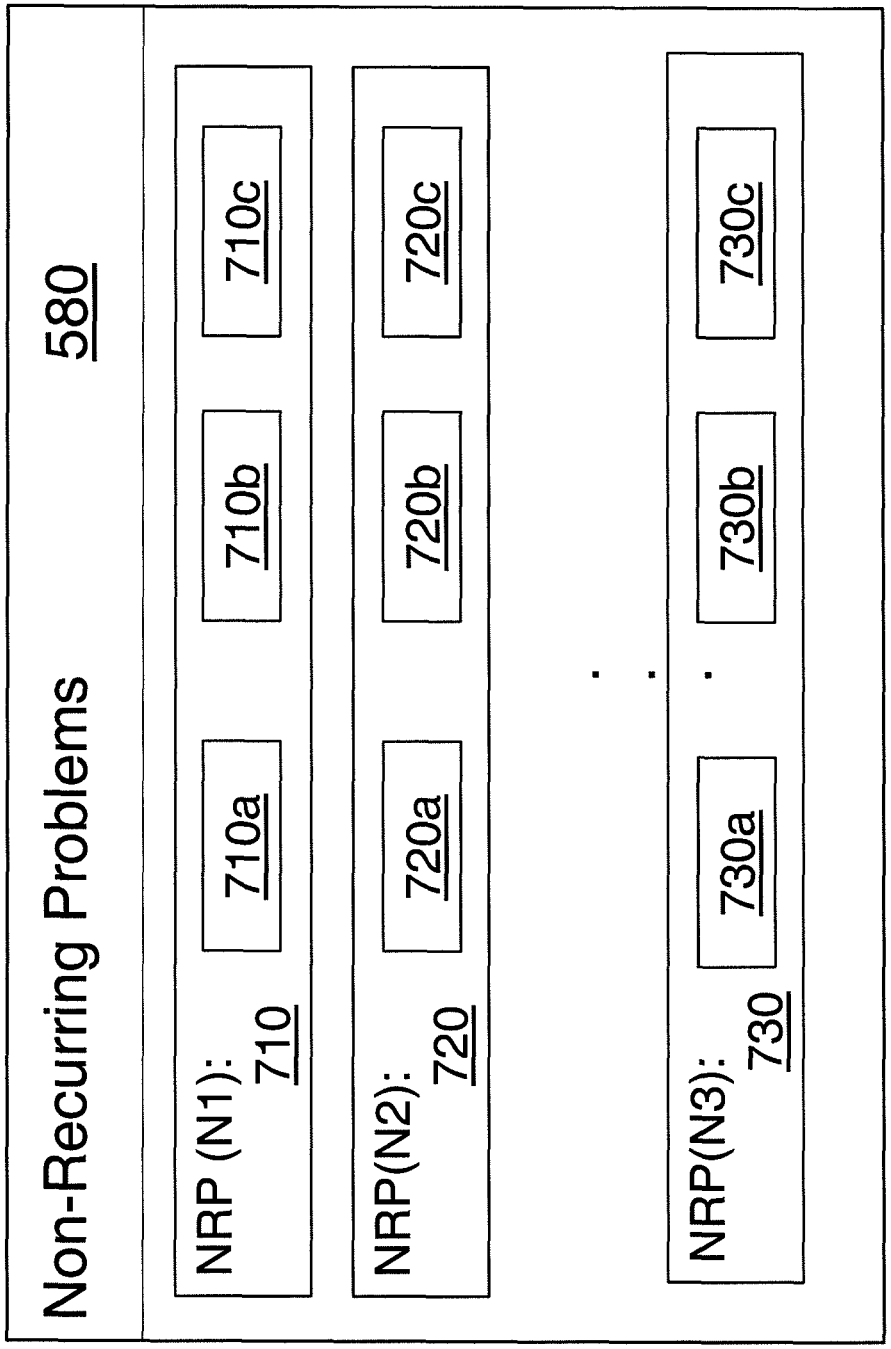
FIG. 7 is a block diagram of an exemplary Non-Recurring Problems field 580 in the exemplary dynamic profile record 500 shown in FIG. 5.

The record 500 may have a Non-Recurring Problems field 580 that stores the set of non-recurring problems in the developer's current projects. The field 580 may store numerous sets of non-recurring problems. As shown in FIG. 7, the field 580 may have a plurality of sub-fields for storing the observed sets of non-recurring problems identified across multiple observations of problems. In the embodiment in which a problem is characterized as not recurring when it has been observed in a majority of a series of observations of problems but not in another, where n1>n2>n3, there may be two sets on NRP(n1), namely one based on (n1, n2) and a second one based on (n1, n3). In addition, there may be a set NRP(n2) based on (n2, n3). Sub-fields 710, 720, 730 may have sub-fields 710*a*, 720*a*, 730*a* for storing sets the first NRP(n1), the second NRP(n1), and NRP(n2), which are the sets of problems that are characterized as no longer recurring. Sub-fields 710, 720, 730 may have subfields 710*b*, 720*b*, 730*b*, for storing the values n1, n1, and n2 respectively. Finally, Sub-fields 710, 720, 730 may have subfields 710*c*, 720*c*, 730*c*, for storing the measurement values n2, n3, and n3 respectively. Alternatively, in the embodiment in which the field 570 has Problem sub-fields for identifying the problems that the developer has faced, with sub-fields to identify in which measurements of problem issues the problem was identified, NRP(n) could be calculated based on inspection of the Problem sub-fields.

Returning to FIG. 5, the dynamic profile may also identify F(n), the number of times that the developer's modifications caused build failures in past <n> units of observation. The unit of observation could be of any suitable type, such as amount of time or number of builds. Generally, the value of F will be greater than or equal to zero and less than or equal to the number of observations. For time units, 0≤F(t)≤t. Therefore, a dynamic profile record stored in repository 140 may contain a field 590 for storing information related to F(n). Further, field 590 may have sub-field 592 for storing the unit value of the failure(s), sub-field 594 for storing the value of F, and/or subfields 596*a*-596*z* for storing characteristics information about the failures themselves.

Returning to the system 100 of FIG. 1, the events and environmental data processor 170 is configured to obtain data from the project environment repository 160 and the guidance repository 150. In one embodiment, the project environment repository 160 contains a project configuration database 162 and a project phase and complexity database 164. The project configuration database 162 may contain records storing data describing the project, identifying all components, phases, timelines, and required elements for the project, such as the identity of the developers assigned to the development project and the schedule for the project. The project phase and complexity database 164 may contain data specific to the current phase of the project and data related to the complexity of the code development project The events and environmental data processor 170 accesses data from the project environment repository 160 in order to identify the context of the project and to determine the nature of difficulty of the problem that the developer is facing.

The guidance repository 150 may contain records storing data describing guidance that has been or may be provided to resolve problems in the project. The guidance repository 150, which may be a knowledge base, may contain data that is updated over time. In one embodiment, the guidance is project-specific, relating to the methodology or APIs that are in use in the project. In other embodiments, the available guidance is broader in scope. In one embodiment, the guidance is a set of guidance instantiations that have been previously implemented in a code development project.

The guidance repository 150 may store a record 800 such as illustrated in FIG. 8 for example. The exemplary record 800 includes an ID field 810 for identifying an instance of guidance, a Type field 820 for containing information about the type of guidance, a Source field 830 for storing data about the source of the provided guidance, a Summary field 840 for storing a summary of the guidance, a Links field 845 for identifying hyperlinks to the guidance, an Environment field 850 for storing data about the suggested system on which the guidance will be useful or on which the guidance was employed.

Additionally or alternatively, record 800 may have a Methodology field 860 for identifying the suggested methodology to apply in taking the guidance or the methodology that was applied when the guidance was taken. Record 800 may also have an API field 870 for identifying the suggested API(s) to use in taking the guidance or the API(s) used when the guidance was taken. The record 800 may also have a Time Stamp(s) field 880 for storing timestamps related to when the guidance was implemented. Record 800 may also have a Success field 890 for storing a measure of the extent of success that developers have achieved in implementing the guidance.

The guidance repository 150 may also store an heuristics/decision table 815 for use in selecting the guidance to suggest. In one embodiment, the rows of the table 815 will identify the categories of events that may demonstrate problems, for example, the table 815 may have a local events row 816a and a global events row 816b. The table 815 may also have a class column 822 to identify the classes of problems that may be associated with a selected event. For example, in the embodiment illustrated in FIG. 8b, local events may be associated with "Compile Issues," "Code Quality Issues," or "Test Related issues" problems; while global events may be associated with "Code Quality Issues," "Test Related Issues," or "Integration Failure" problems.

The table 815 may also have a scope column 824 to identify the scope(s) of the classes of problem(s) that may be associated with a selected event. For example, in the embodiment illustrated in FIG. 8b, a local event in the "Compile Issues" class may be associated with a problem scope of "Public API problem" or "Private API Problem"; while a local event in the "Code Quality Issues" class may be associated with a problem scope of "Public Standard" or "Private Standard." Further, a local event in the "Test Related" class may be associated with only one problem scope, for example, "Project Specific."

The table 815 may also have a guidance precedence/order column 826 to select the kinds of guidance may be associated with a selected event of a selected class and scope. The guidance precedence/order column 826 may have order sub-columns, for example, primary sub-column 827a, secondary sub-column 827b, and tertiary sub-column 827c to identify the kinds of guidance that may be suggested for the a selected event of a selected class and scope and the order in which the guidance may be suggested.

For example, in the embodiment illustrated in FIG. 8b, a developer facing a global event in the "Code Quality Issues" class and of the "Public Standard" scope may first receive a suggestion to check online knowledge bases (available on the Internet). When that suggestion does not resolve the problem, the developer may receive the suggestion to check the organization's knowledge base; if that did not work, she may receive the suggestion to collaborate with a team member. On the other hand, if the global event was in the "Code Quality Issues" class but of the "Project Standard" scope, the developer may first receive a suggestion to check internal project artifacts, followed by a suggestion to collaborate with a team member, followed by a suggestion to check the organization's knowledge base.

In one embodiment, the processor 170 has a guidance selector 172 for which the processor 170 obtains the data from the guidance repository 170. The guidance selector 172 may be configured to select relevant guidance alternatives from the guidance data from the guidance repository 150 in order to present alternatives to present to the developer. The guidance selector 172 may be configured to filter out the guidance already considered and/or to filter the guidance according to past effectiveness.

In one embodiment, the processor 170 has a developer progress score calculator 174, which may be configured to calculate a metric representative of the quality of the progress made by the code developer. In one embodiment, the developer progress score is a composite effectiveness score which is inversely proportional to the number of coding problems that the developer has faced but not yet resolved, inversely proportional to the number of times that the developer's modifications caused build failures in past <n> units (of time or of builds), and directly proportional to the number of coding problems that the developer has resolved.

In one embodiment, the developer progress score (DPS) may be calculated as follows:

$$DPS = K^* (|NRP|/(|RP|+F+1)); \text{ where}$$

K is a project-specific constant;

|NRP| is the number of non-recurring problems in the set NRP(n) defined above,

|RP| is the number of recurring problems in the set RP(n) defined above;

F is the overall failure score defined above; and the value 1 is added to the denominator to avoid division by zero.

One aim of calculating the DPS is to provide feedback to the developer regarding the quality of his or her work on the development project. The manner of feedback is described below.

The events and environmental data processor 170 may also be configured to use the data presented to and created by the guidance selector 172 and the developer progress score calculator 174 to populate the Past Guidance Recommendations field 550, the Progress Scores field 560, the Recurring Problems field 570, the Non-Recurring Problems field 580, and the Failures field 590 in the exemplary dynamic profile record 500 shown in FIG. 5.

The events and environmental data processor 170 may be coupled to the interactive guidance console unit 190 and the periodic reporting unit 105 in order to provide the guidance alternatives and progress quality scores to the developer. In one embodiment, each developer would have a console unit 190 on his or her own workstation to operate as a user interface to the software guidance system 100. In one embodiment, the console unit 190 runs in the background of the developer's workstation, and an icon may be installed on a system tray (not shown) to provide easy access to the console unit 190. Using the console unit, the developer may request guidance with a selected problem, monitor the project progress, or view unsolicited assistance provided by the system 100 due to a system-perceived need for assistance with a problem.

Figure 9:
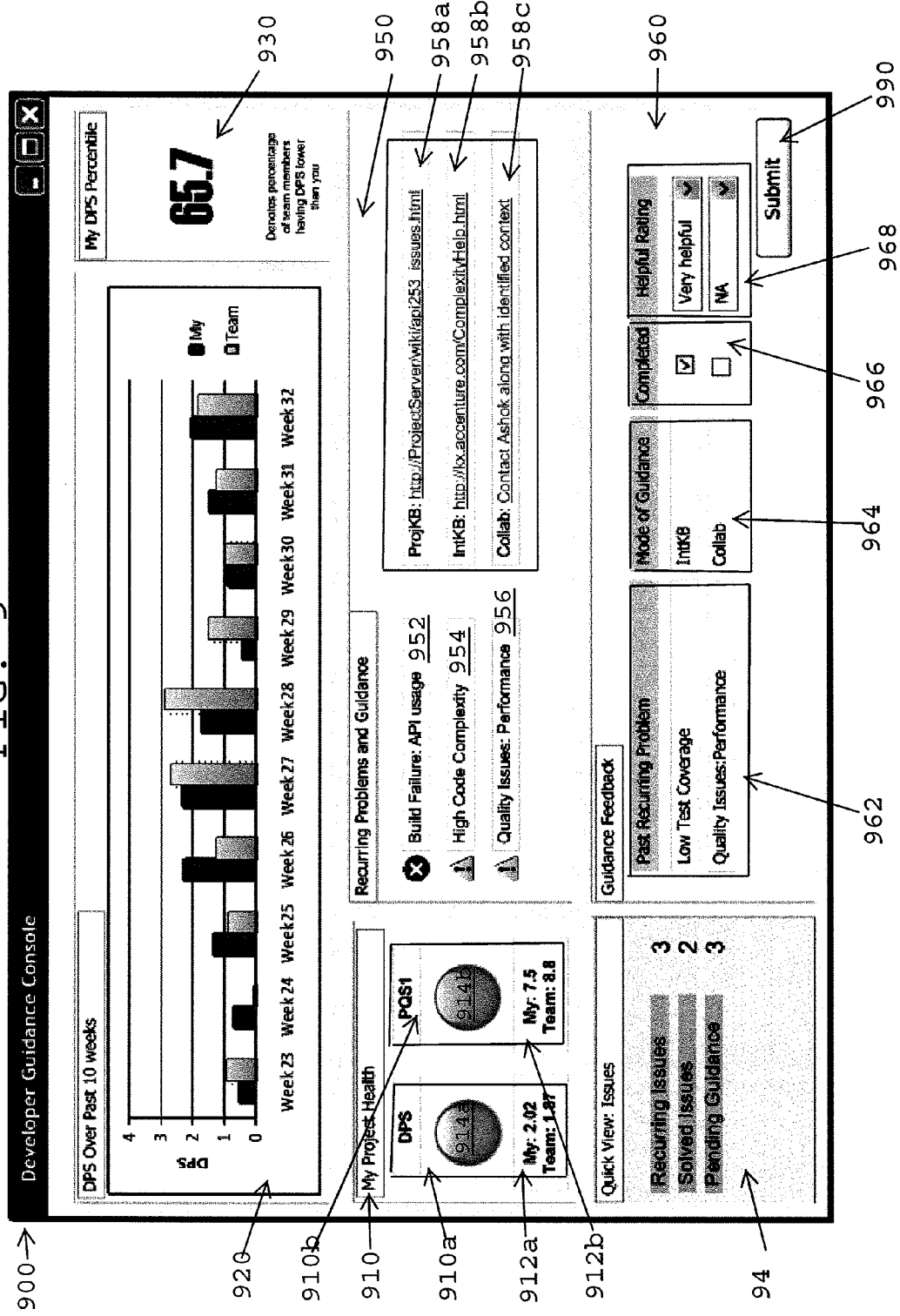
FIG. 9 an exemplary screen shot of an interactive guidance console unit 190 shown in FIG. 1.

The console unit 190 may present to the developer a screen such as shown in FIG. 9. In one embodiment, the screen 900 has a My Project Health section 910 to display metrics about the development project and the developer's contribution to the project. The My Project Health section 910 may have a DPS display sub-field 910*a* to display in a section 912*a* the developer progress score (DPS) across past <n> measurements, described above, and a team DPS for the development team. The My DPS display sub-field 910*a* may also have a colored "Orb" display in section 914*a* for showing a visual representation of the value of the developer's DPS metric relative to the value of the DPS metric for the development team. For example, in one embodiment, a green display may indicate that the developer's progress relative to her team is good; an amber display may indicate that the developer's progress needs some improvement; and a red display may indicate that the developer's progress relative to her team is poor.

The DPS display sub-field 910*a* may also have section to display the developer and team DPS trends across past <n> measurements. Alternatively, as shown in FIG. 9, the DPS trend may be displayed in a separate field 920 of the screen 900. In field 920, DPS trends are shown as a bar graph but any suitable graphic display is contemplated. Percentile DPS may also be calculated, using development team level information, and displayed to provide information as to the developer's progress relative to others on the development team. In My DPS Percentile field 930, a DPS percentile may be displayed to show the developer the percentage of team members having DPS lower than the developer's DPS.

In one embodiment, the screen 900 has a personal quality score field to provide information about the level of quality of the developer's coding work. In the embodiment shown in FIG. 9, the My Project Health field has a PQS display section 910*b* that displays one or more calculations of a developer's current PQS, described above, and other data based on PQS. For example, the PQS display section 910*b* may provide displays of PQS1 and/or PQS2, disclosed above, their trends across past <n> measurements, or a moving average of PQS1 or PQS2—with a window of past <n> scores. Composite PQS may be developed and displayed, and the individual scores may be weighted such that the most recently calculated score contributes highest to the composite score. Percentile PQS1 or PQS2, using development team level information, may also be calculated and displayed to provide information as to the developer's quality relative to others on the development team. Such metrics could be displayed on the screen 900. Alternatively, screen 900 may have links or tabs to access displays of the metrics. In the embodiment shown in FIG. 9, the PQS display sub-field 910*b* displays in a section 912*b* a developer PQS1 and a team PQS1. The My PQS1 display sub-field 910*b* may also have a colored "Orb" display in section 914*b* for showing a visual representation of the value of the developer's PQS1 metric relative to the value of the PQS1 metric for the development team. For example, in one embodiment, a green display may indicate that the developer's quality relative to her team is good; an amber display may indicate that the developer's personal quality needs some improvement; and a red display may indicate that the developer's quality relative to her team is poor. In the embodiment shown in FIG. 9, the screen 900 has a Quick View: Issue field 940 to display a count of the recurring issues facing the developer, solved issues, and pending guidance for the developer. In one embodiment, the counts serve as drill-downs, providing links to other screens, not shown, displaying the recurring issues, solved issues, and/or pending guidance.

In the embodiment shown in FIG. 9, the screen 900 has a Recurring Problems and Guidance field 950 to display information about the recurring problems that the developer has faced. Field 950 has a Build Failure: API Usage Alert sub-field 952 to display an alert if the code shows signs of a build failure due to improper usage of an API, a Complexity Alert sub-field 954 to display an alert if the code shows signs of being highly complex, and a Performance Alert sub-field 956 to display an alert if the developer's code shows signs of having low quality. In one embodiment, the Alert sub-fields serve as drill-downs, providing links to other screens, not shown, displaying the additional information about the failures, complexity, and quality issues identified by system 100.

In one embodiment, the console unit 190 has a guidance recommendation section to display the guidance alternatives that were suggested to the developer. Referring to FIG. 9, field 950 has a Guidance sub-field 958 to display suggested guidance. Guidance sub-field 958 has sections 958*a*, 958*b*, and 958*c* to display the suggested guidance and to provide drill-downs such as links to the suggested guidance. In FIG. 9, section 958*a* is displaying a link to a guidance record found in a project knowledge base (ProjKB), section 958*b* is displaying a link to a guidance record found in an internal knowledge base (IntKB), and section 958*c* is displaying a suggestion to collaborate with a person ("Contact Ashok along with identified context"). As discussed in more detail below, the Guidance sub-field 958 could also display guidance in the form of links, messages, or another convenient mechanism.

In one embodiment, the console unit 190 has a feedback section to display data relating to whether the suggested input was taken or not taken by the developer and whether the suggested input was found to be helpful or not helpful to the developer. In the embodiment shown in FIG. 9, the screen 900 has a Guidance Feedback field 960 to display information about the recurring problems that the developer has faced and allow the developer to provide feedback as to the usefulness of the guidance.

Section 960 has a Past Recurring Problem sub-field 962 to display the recent problems that the developer has faced. In one embodiment, the sub-field 962 is populated with data from the developer dynamic profile 500 retrieved from the developer profile repository 140. In one embodiment, the data from the Developer profile 500 is read automatically into the sub-field 962. Section 960 also has a Mode of Guidance sub-field 964 to identify the type of guidance that was suggested to resolve the problem, a Completion sub-field 966 to allow the developer indicate whether the developer has completed consideration of the suggested guidance, and a Helpfulness sub-field 968 to indicate the extent of usefulness that the guidance provided. Each of the sub-fields 962, 964, 966, 968 have fields to display multiple problems, the associated suggested guidance, and completion and usefulness indicators. Further, the screen 900 has a Submit button 990 to allow the developer to submit his or her feedback about the completion and usefulness of the suggested guidance.

One of skill in the art will appreciate that the above-described features may be displayed directly on the screen 900 or alternatively, links, tabs, pull-down lists, or other display mechanisms could be utilized to provide the above features.

Also, one of skill in the art will appreciate that the above-described features could be organized as shown in FIG. 9 or in any other convenient way. Further, one of skill in the art will appreciate that any information about coding quality such as metrics may be conveniently displayed on screen 900 or through a link from screen 900.

In one embodiment, the displayed code quality indices may be directly based on coding violations reported through static analysis. A plurality of coding violation indications corresponding to software code are categorized according to a plurality of coding quality attributes. The coding violation indications may be reported via static analysis tools or via manual analysis of the software code. The categorized coding violations may serve as the basis for determining a plurality of code quality indices, each corresponding to a respective one of the plurality of coding quality attributes. The coding quality indices may further be processed to determine an overall code quality index for the software code. One or more of the resulting code quality indices may be displayed. Embodiments of coding quality indices are described in further detail in co-pending Indian Patent Application 1987-MUM-2009, filed Sep. 1, 2009, and entitled "ASSESSMENT OF SOFTWARE CODE QUALITY BASED ON CODING VIOLATION INDICATIONS" (Applicant reference number 02178-PR/IN).

The interactive guidance console unit 190 is connected to the guidance feedback unit 180 to identify which of the guidance alternatives was considered or tried by the developer, and the extent of success of the developer in resolving the problem that could be attributed to the suggested guidance. The guidance feedback unit 180 may be connected to the developer profile repository 140 to provide input to update the dynamic profile records of the developer.

The events and environmental data processor 170 may be connected to a periodic reporting unit 105, which in one embodiment may provide periodic reports to the developer, the development team, or other interested party. The reports may include reports of the progress metrics created by the progress metric calculator 174 or the guidance alternatives suggested by the guidance selector 172. The reports may include an identifier of the guidance used by the developer and the extent of success based on the guidance. The reports may also include updates to the guidance repository 150, developer profile repository 140, event characteristics database 120 and environmental data repository 160.

FIG. 10 shows a flowchart illustrative of one embodiment of a process 1000 for providing software developer guidance. The guidance process 1000 starts at stage 1010 by the events extractor 130 collecting data related to events. When a software development problem occurs, events from components being used in software development, such as a tool or IDE, contain details about the problem. For example, the event category, class and scope may provide identifying information about the problem. In addition, details as to where and when the problem occurred and by whom may be determined by analyzing the event data. In one embodiment, the events extractor 130 receives event data automatically from the local event monitor 110 and the global event monitor 115. In another embodiment, the extractor 130 continually monitors such events. The events extractor 130 obtains data related to local or global events from the monitors 110, 115 and from the event characteristics database 120. It also receives data related to developers from developer profile repository 140, and data related to previous instances of guidance from the guidance repository 150, and forwards the data to the events and environmental data processor 170.

At stage 1020, the processor 170 processes the events data, project data, and developer data received from the events extractor 130 to identify recurrence patterns of events that may demonstrate the existence of a problem. In addition to the data that it receives from the events extractor 130, the processor 170 uses data about the system environment in which the problem arose, which it obtains from the environmental data repository 160. The processor 170 also uses further data from the static and dynamic profiles of the developer, which it obtains from the developer profile repository 140, and data related to previous instances of guidance, which it obtains from the guidance repository 150. Based on the recurrence patterns and the type of certain events, the processor 170 marks a problem as a recurring problem (RP). Similarly, the processor identifies the RPs which are no longer recurring, for example in the manners disclosed above, and calculates a value for Non-Recurring Problem (NRP).

At stage 1030, the processor 170 identifies an event that may constitute a problem that could benefit from guidance. the processor identifies the event's category, class, and scope from the data analyzed in stage 1020. From the event's category, class and scope, the processor 170 identifies the problem that could benefit from guidance. The processor 170 may also make the identification based in part on the category/severity of the identified problem and the number of occurrences and or frequency of occurrences of the problem. The processor 170 also determines the extent of difficulty that the developer is facing.

At stage 1040, the processor 170 selects relevant guidance alternatives from the guidance repository 150. In one embodiment, the processor 170 makes the selections based on heuristic rules that are stored in an heuristic/decision table in the guidance repository 150 shown in FIG. 1. As described above, the table 815 has rules for selecting the kinds of guidance that may be associated with a selected event of a selected class and scope. If an event "recurs", it becomes a problematic event. Based on the problematic event's category, class and scope, the processor 170 recommends guidance of a selected type in the order stored in the table 815.

For example, in the embodiment illustrated in FIG. 8b, a developer facing a global event in the "Test Related" class and of the "Project Specific" scope may first receive a suggestion to check internal project artifacts, followed by a suggestion to collaborate with a team member. For each problematic event, the specific guidance suggestions for different types of guidance are stored in the guidance repository. If a developer has been offered a guidance and the problem still recurs, that factual situation is recorded in the dynamic profile. The guidance next in order may be suggested.

The order of guidance to be suggested as recorded in table 815 may change over time depending on a particular guidance type being considered more helpful for a particular event by the developers in their feedback. This table typically will also differ for developers with different levels of experience, skills and time in the project. Data about a developer's levels of experience, skills and time in the project is stored in the static developer profile and is made available to the processor 170 in selecting the guidance to provide.

The guidance alternatives may be configured differently for developers with different levels of experience, skill, and assignment. The exemplary table 815 for guidance selection rules is just an instance to be used for a moderately experienced and skilled person. If, for example, the person is new and inexperienced, the first priority might be given to internal (project or org level) knowledge bases to make them more current date with what is common knowledge to a more experienced person. Therefore, one of ordinary skill in the art will appreciate that there may be several heuristic tables 815 for different levels of experience, skill, and assignment.

At stage 1050, the processor 170 uses the guidance alternatives and the developer profile data from the developer profile repository 140 to filter out the guidance already provided and to rank guidance according to past effectiveness. At a stage 1060, the processor 170 provides identifies suggested guidance to the interactive guidance console unit 190. That information may be displayed, for example, on the screen 900 in the Guidance sub-field 958 in sections 958a, 958b, 958c.

As shown in FIG. 10, the suggested guidance may be in the form of on-line artifacts, project artifacts, and/or collaboration. On-line artifacts may include internal training documents, internal knowledgebase documents, or external knowledge base documents. Project artifacts may include documentation from the project, including but not limited to prior events, project logs, and logged discussions. Suggestions of collaboration with others may include a suggestion to connect to subject matter experts within the project or to experts outside of the project, for example, experts within the organization.

At stage 1060, the processor 170 may also provide information about suggested guidance to the periodic reporting unit 105, which creates reports as required, for example, for review by supervisors or for other administrative uses about or the guidance alternatives suggested by the guidance selector 172. The reports may identify the guidance used by the developer and the extent of success based on the guidance. The reports may also include updates to the guidance repository 150, developer profile repository 140, event characteristics database 120, and environmental data repository 160. Alternatively, as shown in FIG. 1, the updates are provided by the guidance feedback unit 180.

At stage 1060, the processor may also provide warnings about high code complexity or build failures to the console unit 190 so that the screen 900 can display an alert if the code shows signs of being highly complex or if build failures are occurring. The alerts may be displayed, for example, in the Build Failure: API Usage Alert sub-field 952 and Complexity Alert sub-field 954 of Guidance field 950.

FIG. 11 shows a flowchart illustrative of one embodiment of a process 1100 for providing the software developer feedback regarding the quality of his code development. The quality oversight process 1100 starts at stage 1110 when a quality review is initiated, for example by the events and environmental data processor 170. This quality review may occur according to any desired schedule, for example, hourly, daily, weekly, monthly, or it may be run continually, for example, updating itself every time that new data is presented to the processor 170.

At stage 1120, the processor 170 obtains information about code development in the project. Such information may include data from the static and dynamic profiles of the developer and of the developer's team members from the developer profile repository 140. Data may also include data related to local or global events from the local and global events monitors 110, 115, data from the event characteristics database 120, data related to previous instances of guidance (and whether it was followed by the developer) from the guidance repository 150, and data about the system environment in which problems arose from the environmental data repository 160.

At stage 1130, the developer progress score calculator 174 of processor 170 calculates metrics values representative of the quality of the progress made by the code developer, for example, developer and team DPS across a series of measurements. The calculator 174 creates the developer and team DPS values, for example, in section 912a of the screen 900.

The processor 170 may further generate the charts of DPS trends, for example, for display on the DPS trend display field 920 of screen 900. The calculator 174 may also generate a DPS percentile value to provide information as to the developer's progress relative to others on the development team, for example, for display in the DPS Percentile field 930 of the screen 900.

At stage 1140, the calculator 174 also calculates the developer and team PQS1 values to provide information about quality of the software development work and, for example, to display in the PQS display section 910b of screen 900. The calculator 174 may also calculate any other desired progress or quality values such as PQS2 or a moving average of PQS1 or PQS2—with a window of past <n> scores. It may also develop percentile PQS1, percentile PQS2, composite PQS values, or composite weighted PQS values for display on screens of the screen 900 that are not here shown. The processor may develop graphs related to PQS score, also for display on screen 900.

At stage 1150, the processor 170 provides values of progress and quality metrics to the console unit 190 for display. The processor 170 may further provide progress and quality metrics graphs to the interactive guidance console unit 190, so that the information may be displayed, for example, on the screen 900 in the sections 910, 920, 930. At stage 1150, the processor may also provide quality warnings to the console unit 190 so that the screen 900 can display an alert if there are signs of low code development quality. The alert may be displayed, for example, in the Alert sub-field 952 and Performance Alert sub-field 956 of Recurring Problems and Guidance field 950.

At stage 1150, or in the embodiment shown in FIG. 11 at stage 1160, the databases, knowledge bases and repositories are updated. The updating may be done by the processor 170 or, as shown in FIG. 1, the console unit 190 may forward the information to the guidance feedback unit 180 so that the unit 180 may perform the updating.

One of skill in the art will appreciate that the above-described stages may be embodied in distinct software modules. Although the disclosed components have been described above as being separate units, one of ordinary skill in the art will recognize that functionalities provided by one or more units may be combined. As one of ordinary skill in the art will appreciate, one or more of units may be optional and may be omitted from implementations in certain embodiments.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations may be implemented in software, hardware, or a combination of hardware and software. Examples of hardware include computing or processing systems, such as personal computers, servers, laptops, mainframes, and micro-processors. In addition, one of ordinary skill in the art will appreciate that the records and fields shown in the figures may have additional or fewer fields, and may arrange fields differently than the figures illustrate. It is intended that the specification and examples be considered as exemplary only, with a true scope and spirit of the invention being indicated by the following claims.

We claim:

1. A method for providing assistance to software developers, comprising:
   accessing a profile of a software developer comprising information about a software development history of the software developer;
   developing event data with an events extractor, wherein the event data relates to the software developer and at least one software code event from a software development project;
   selecting guidance, with an events and environmental data processor, for use by the software developer in resolving a software development problem, wherein the guidance is selected based on an analysis of the event data, data related to the software development project, data related to an environment in which the at least one software code event occurred, and the profile of the software developer; and
   presenting the guidance to the software developer with a display device comprising an interactive console unit.

2. The method of claim 1, wherein the profile includes information about previous software development experience by the software developer.

3. The method of claim 1, wherein the profile includes information about previous software coding problems faced by the software developer.

4. The method of claim 3, wherein the previous software coding problems comprise recurring software development problems faced by the software developer.

5. The method of claim 4, wherein the previous software coding problems comprise software development problems having a high likelihood of having been resolved.

6. The method of claim 1, wherein the profile includes information about previous software development problems experienced by the software developer.

7. The method of claim 1, wherein selecting the guidance further comprises ordering the guidance according to past effectiveness in resolving one or more software development problems.

8. The method of claim 1, wherein the software development project comprises a first software development project, and wherein the guidance comprises a suggestion to refer to documentation related to a second software development project and identification of the documentation related to the second software development project.

9. The method of claim 1, wherein the guidance comprises a suggestion to refer to documentation related to the software development project and an identification of the documentation related to a second software development project.

10. The method of claim 1, wherein the guidance comprises a suggestion to collaborate with another person or entity and identification of the another person or entity.

11. The method of claim 1, further comprising developing feedback regarding progress of the software developer in the development project from the event data and the profile of the software developer.

12. The method of claim 1, wherein developing the guidance further comprises developing the guidance in response to an automated identification of a need for the guidance.

13. The method of claim 12, further comprising identifying the need for the guidance based on trends in software development problems faced by the software developer.

14. A method for providing assistance to software developers, comprising:
   accessing a profile of a software developer containing a software development history of the software developer;
   developing event data with an events extractor, wherein the event data relates to the software developer and at least one software code event from a software development project;
   developing feedback related to progress of the software developer in the software development project, wherein the feedback is developed by an events and environmental data processor from the event data and the profile of the software developer; and
   presenting the feedback to the software developer via a display device comprising an interactive console unit.

15. The method of claim 14, wherein developing the feedback further comprises developing a value for at least one metric related to an extent of the developer progress in the development project.

16. The method of claim 14, wherein developing the feedback further comprises developing a value for at least one metric related to a quality of the software developer progress in the development project.

17. The method of claim 14, wherein developing the feedback further comprises identifying a trend in the software developer progress and presenting data corresponding to the trend.

18. The method of claim 14, wherein developing the feedback further comprises developing a value related to the software developer progress relative to progress by other software developers.

19. A system for providing assistance to software developers, comprising:
   a processor;
   a display device; and
   a non-transitory computer-readable medium, wherein the computer-readable medium contains instructions for executing on the processor, the instructions including:
   an events extractor configured to
      access a profile of a software developer containing a software development history of the software developer, and
      develop event data that relates to the software developer and at least one software code event from a software development project; and
   an events and environmental data processor configured to
      select guidance for use by the software developer in resolving a software development problem, wherein the guidance is selected based on an analysis of the event data, data related to the software development project, data related to an environment in which the at least one software code event occurred, and the profile of the software developer; and
      present the guidance to the software developer via the display device comprising an interactive console unit.

20. The system of claim 19, wherein the events and environmental data processor is further configured to develop feedback regarding progress of the software developer in the development project from the event data and the profile of the software developer.

21. A system for providing assistance to software developers, comprising:
   a processor;
   a display device; and
   a non-transitory computer-readable medium, wherein the computer-readable medium contains instructions for executing on the processor, the instructions including:
   an events extractor configured to
      access a profile of a software developer containing a software development history of the software developer, and develop event data that relates to the software developer and at least one software code event from a software development project; and an events and environmental data processor configured to develop feedback related to progress of the software developer in the development project from the event data and the profile of the software developer; and present the feedback to the software developer with the display device comprising an interactive console unit.

22. A non-transitory computer readable medium embodying a computer program for providing assistance to software developers, wherein the computer program is configured to perform a method comprising:

accessing a profile of a software developer containing a software development history of the software developer;

developing event data with an events extractor, wherein the event data relates to the software developer and at least one software code event from a software development project;

selecting guidance, with an events and environmental data processor, for use by the software developer in resolving a software development problem, wherein the guidance is selected based on an analysis of the event data, data related to the software development project, data related to an environment in which the at least one software code event occurred, and the profile of the software developer; and presenting the guidance to the software developer with a display device comprising an interactive console unit.

23. The computer-readable medium of claim 22, wherein the computer program is further configured to develop feedback regarding progress of the software developer in the development project from the event data and the profile of the software developer.

24. A non-transitory computer-readable medium embodying a computer program for providing assistance to software developers, wherein the computer program is configured to perform a method comprising:

accessing a profile of a software developer containing a software development history of the software developer;

developing event data with an events extractor, wherein the event data relates to the software developer and at least one software code event from a software development project;

developing feedback related to progress of the software developer in the development project, wherein the feedback is developed by an events and environmental data processor from the event data and the profile of the software developer; and presenting the feedback to the software developer via a display device comprising an interactive console unit.

* * * * *